(12) United States Patent  (10) Patent No.: US 8,908,847 B2
Berger et al.  (45) Date of Patent: Dec. 9, 2014

(54) SYSTEM AND METHOD FOR DEEP DIALING PHONE SYSTEMS

(75) Inventors: Shai Berger, Toronto (CA); Jason P. Bigue, Toronto (CA)

(73) Assignee: FonCloud, Inc., Toronto (CA)

( * ) Notice: Subject to any disclaimer, the term of this patent is extended or adjusted under 35 U.S.C. 154(b) by 196 days.

(21) Appl. No.: 12/400,968

(22) Filed: Mar. 10, 2009

(65) Prior Publication Data

US 2009/0202050 A1    Aug. 13, 2009

Related U.S. Application Data

(63) Continuation-in-part of application No. 12/396,603, filed on Mar. 3, 2009, and a continuation-in-part of application No. 12/276,621, filed on Nov. 24, 2008.

(60) Provisional application No. 61/035,195, filed on Mar. 10, 2008, provisional application No. 61/035,204, filed on Mar. 10, 2008, provisional application No. 61/033,856, filed on Mar. 5, 2008, provisional application No. 60/989,908, filed on Nov. 23, 2007.

(51) Int. Cl.
*H04M 3/42*    (2006.01)

(52) U.S. Cl.
USPC .................................. 379/210.01; 379/93.17

(58) Field of Classification Search
USPC ......... 379/266.01, 210.01, 309, 93.01, 93.17; 455/566
See application file for complete search history.

(56) References Cited

U.S. PATENT DOCUMENTS

| | | | |
|---|---|---|---|
| 4,169,217 A | 9/1979 | Szanto et al. | |
| 4,228,324 A | 10/1980 | Rasmussen et al. | |
| 4,425,479 A | 1/1984 | Dubner et al. | |
| 4,731,822 A | 3/1988 | Berry, III et al. | |
| 4,834,551 A | 5/1989 | Katz | |
| 4,870,680 A | 9/1989 | Ohtsuka et al. | |
| 5,627,884 A | 5/1997 | Williams et al. | |
| 5,640,448 A | 6/1997 | Toyoshima | |
| 5,737,393 A | 4/1998 | Wolf | |
| 5,764,746 A | 6/1998 | Reichelt | |
| 5,802,526 A * | 9/1998 | Fawcett et al. | 379/88.13 |
| 5,822,405 A * | 10/1998 | Astarabadi | 379/88.04 |
| 6,031,905 A | 2/2000 | Furman et al. | |
| 6,049,600 A | 4/2000 | Nabkel et al. | |
| 6,104,797 A | 8/2000 | Nabkel et al. | |
| 6,118,861 A | 9/2000 | Gutzmann et al. | |
| 6,122,346 A | 9/2000 | Grossman | |
| 6,141,328 A | 10/2000 | Nabkel et al. | |
| 6,195,417 B1 * | 2/2001 | Dans | 379/67.1 |
| 6,201,855 B1 | 3/2001 | Kennedy | |
| 6,456,699 B1 * | 9/2002 | Burg et al. | 379/88.17 |
| 6,501,750 B1 | 12/2002 | Shaffer et al. | |

(Continued)

FOREIGN PATENT DOCUMENTS

EP    1156649    11/2001
JP    2001285493 A    10/2001

(Continued)

*Primary Examiner* — Olisa Anwah

(74) *Attorney, Agent, or Firm* — Carl M. Napolitano; GrayRobinson, P.A.

(57) ABSTRACT

An independent communications system (ICS) is used in a transaction between a waiting party and a queuing party, with the queuing party having a interactive voice response (IVR). The IVR includes multiple nodes and the ICS is adapted to connect to a particular node in the IVR.

27 Claims, 6 Drawing Sheets

(56) References Cited

U.S. PATENT DOCUMENTS

| | | |
|---|---|---|
| 6,512,852 B1 | 1/2003 | Wu et al. |
| 6,563,921 B1 | 5/2003 | Williams et al. |
| 6,584,184 B1 | 6/2003 | Nabkel et al. |
| 6,594,484 B1 * | 7/2003 | Hitchings, Jr. ............ 455/414.1 |
| 6,643,641 B1 | 11/2003 | Snyder |
| 6,674,725 B2 | 1/2004 | Nabkel et al. |
| 6,684,224 B2 | 1/2004 | Meding et al. |
| 6,694,008 B1 | 2/2004 | Mukherji et al. |
| 6,724,885 B1 | 4/2004 | Deutsch et al. |
| 6,754,334 B2 | 6/2004 | Williams et al. |
| 6,757,260 B2 | 6/2004 | Pandit |
| 6,763,090 B2 | 7/2004 | Che et al. |
| 6,788,770 B1 | 9/2004 | Cook et al. |
| 6,804,342 B1 | 10/2004 | Gadant |
| 6,807,274 B2 | 10/2004 | Joseph et al. |
| 6,813,636 B1 | 11/2004 | Bean et al. |
| 6,836,478 B1 | 12/2004 | Huang et al. |
| 6,914,962 B2 | 7/2005 | Neary |
| 6,920,425 B1 | 7/2005 | Will et al. |
| 6,990,524 B1 | 1/2006 | Hymel |
| 6,999,944 B1 | 2/2006 | Cook |
| 7,027,408 B2 | 4/2006 | Nabkel et al. |
| 7,027,990 B2 | 4/2006 | Sussman |
| 7,065,203 B1 | 6/2006 | Huart et al. |
| 7,092,738 B2 * | 8/2006 | Creamer et al. ............ 455/563 |
| 7,095,840 B2 * | 8/2006 | Dezonno et al. ......... 379/265.09 |
| 7,113,987 B2 | 9/2006 | Nabkel et al. |
| 7,120,244 B2 | 10/2006 | Joseph et al. |
| 7,130,411 B2 * | 10/2006 | Brown et al. ............ 379/266.01 |
| 7,136,478 B1 | 11/2006 | Brand et al. |
| 7,174,011 B2 | 2/2007 | Kortum et al. |
| 7,215,759 B2 | 5/2007 | Brown et al. |
| 7,221,753 B2 | 5/2007 | Hutton et al. |
| 7,228,145 B2 | 6/2007 | Burritt et al. |
| 7,231,035 B2 * | 6/2007 | Walker et al. ............ 379/266.01 |
| 7,251,252 B2 | 7/2007 | Norby |
| 7,315,617 B2 | 1/2008 | Shaffer et al. |
| 7,324,633 B2 * | 1/2008 | Gao et al. .................. 379/88.18 |
| 7,349,534 B2 | 3/2008 | Joseph et al. |
| 7,414,981 B2 | 8/2008 | Jaramillo et al. |
| 7,715,531 B1 | 5/2010 | Golding et al. |
| 8,155,276 B2 * | 4/2012 | Beauregard et al. ............ 379/74 |
| 8,160,209 B2 | 4/2012 | Wang et al. |
| 8,223,929 B2 * | 7/2012 | Sylvain ..................... 379/88.01 |
| 2003/0112931 A1 | 6/2003 | Brown et al. |
| 2004/0202309 A1 | 10/2004 | Baggenstoss et al. |
| 2005/0147219 A1 | 7/2005 | Comerford |
| 2005/0147227 A1 | 7/2005 | Chervirala et al. |
| 2006/0095564 A1 | 5/2006 | Gissel et al. |
| 2006/0106613 A1 | 5/2006 | Mills |
| 2006/0126803 A1 | 6/2006 | Patel et al. |
| 2006/0245579 A1 | 11/2006 | Bienfait et al. |
| 2006/0256949 A1 | 11/2006 | Noble |
| 2007/0041564 A1 | 2/2007 | Antilli |
| 2007/0071223 A1 | 3/2007 | Lee et al. |
| 2007/0165608 A1 | 7/2007 | Altberg et al. |
| 2007/0280460 A1 * | 12/2007 | Harris et al. ............ 379/201.01 |
| 2008/0039056 A1 | 2/2008 | Mathews et al. |
| 2008/0144786 A1 | 6/2008 | Wang et al. |
| 2008/0159495 A1 | 7/2008 | Dahan |
| 2009/0149158 A1 * | 6/2009 | Goldfarb et al. ............ 455/414.1 |
| 2009/0154678 A1 | 6/2009 | Kewin et al. |
| 2010/0057456 A1 | 3/2010 | Grigsby et al. |
| 2011/0103559 A1 | 5/2011 | Andrews et al. |

FOREIGN PATENT DOCUMENTS

| | | |
|---|---|---|
| JP | 2004304770 A | 10/2004 |
| KR | 20040039586 A | 5/2004 |
| KR | 20040106487 | 12/2004 |
| KR | 1020050002930 | 1/2005 |

\* cited by examiner

| INFO | X |
|---|---|
| CALL STATUS: | DAILING THE COMPANY |
| ELAPSED TIME: | 2:34 |
| VOICE ADDRESS: | 212-555-1111 |
| CANCEL CALL | CHANGE VOICE ADDRESS |

*FIG. 6*

SYSTEM AND METHOD FOR DEEP DIALING PHONE SYSTEMS

CROSS-REFERENCE TO RELATED APPLICATIONS

This application claims priority from U.S. Provisional Patent Applications having Ser. Nos. 61/035,195 and 61/035,204, both filed on Mar. 10, 2008 and to U.S. Utility patent application Ser. No. 12/396,603, filed Mar. 3, 2009, which itself claims priority to Provisional Application Ser. No. 61/033,856, filed Mar. 5, 2008 and is a Continuation-In-Part of U.S. application Ser. No. 12/276,621 filed Nov. 24, 2008, which itself claims the benefit of U.S. Provisional Patent Application Ser. No. 60/989,908, filed Nov. 23, 2007, the disclosures of which are hereby incorporated by reference herein in their entireties and all commonly owned.

FIELD OF INVENTION

The present invention relates to the field of communication call management, and, more particularly, to automated call completion and automated IVR interaction and related methods.

BACKGROUND OF THE INVENTION

Today, when a user (a waiting party) calls a large company or service center or (a queuing party), it is very likely that he or she will be connected to an interactive voice response (IVR) system. Such systems present the waiting party with information via a series of queues such as audio prompts and get input from the caller, via dial tone multi-frequency (DTMF) tones (also known as "touch tones") or verbal commands. It is very desirable to provide a communication system and method which allows a waiting party (the waiting party) to reach a particular point in an IVR system directly, that is, without navigating through the menu hierarchy to reach that point. In the present disclosure, this process is referred to as "deep dialing". Such systems may also be referred to as "phone menus" or "phone trees".

SUMMARY OF THE INVENTION

Embodiments of the present invention provide in one aspect an independent communication system (ICS) used in a transaction between a waiting party and a queuing party, the queuing party having a interactive voice response (IVR), the IVR having a plurality of nodes, the ICS adapted to connect to a particular node in the IVR.

In another aspect, the present embodiments provide a method used in a transaction between a waiting party and a queuing party, the queuing party having a interactive voice response (IVR), the IVR having a plurality of nodes, the method comprising enabling the waiting party to connect to a particular node in the IVR.

BRIEF DESCRIPTION OF THE DRAWINGS

For a fuller understanding of the invention, reference is made to the following detailed description, taken in connection with the accompanying drawings illustrating various embodiments of the present invention, in which:

FIG. 6 is an illustration of a call status report generated according to an exemplary embodiment.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

The embodiments presented herein provide a system and method which allows the waiting party to dial into a particular node in the IVR map used by a queuing calling system (QCS) of a queuing party in a transaction which might be through a landline phone, mobile phone, web-based phone, softphone, and the like.

Figure 1:
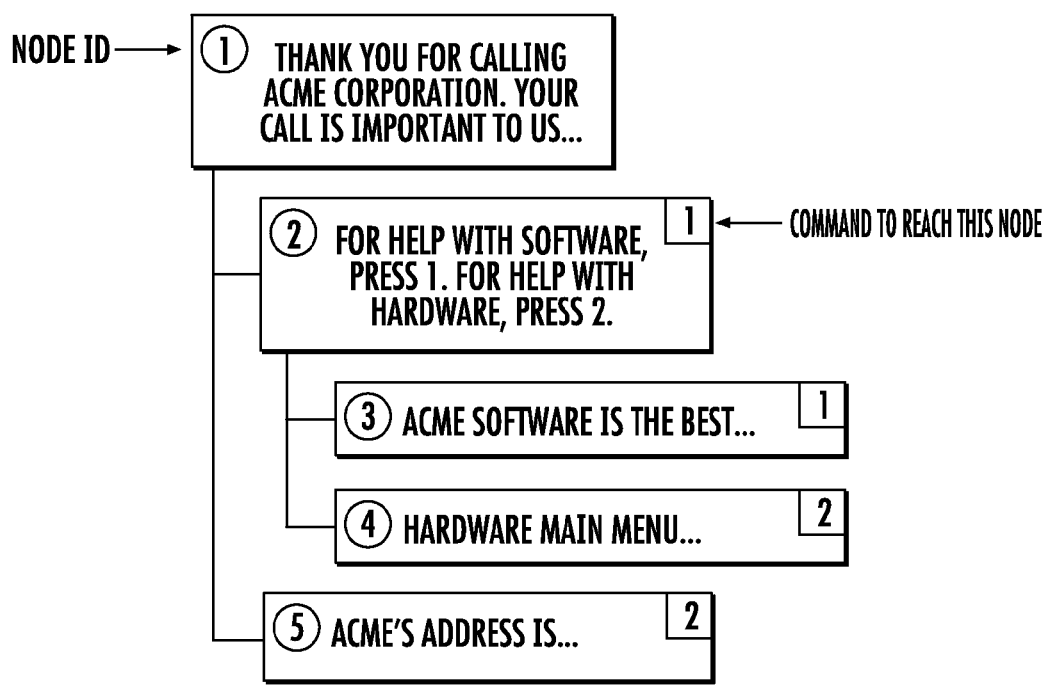
FIG. 1 is an illustration of an exemplary IVR map.

An "IVR map" is a structured list of all the possible paths through a given IVR system, where each path consists of one or more nodes. FIG. 1 shows an illustrative example of such an IVR map. Each node in an IVR map represents a specific point in a tree-like structure where the waiting party may be prompted to send a command by entering data, e.g. via punching in numbers on a dial pad, or spelling out commands verbally, etc. The result of this action by the waiting party advances him or her onto the next node and so on and so forth in order to eventually reach a node through which he or she could execute an originally intended function.

Accordingly, each node in the map includes a prompt and possibly one or more commands. The prompt is, for example, the audio that is heard by the caller and is represented in the map by the corresponding text. Each command can be a DTMF tone or a verbal command and allows the caller to navigate to another node in the IVR system, or will put the caller in a queue to speak to a live agent.

The strength of the IVR system is its universality. It works on any phone and is usable by even the least technically inclined people. IVR systems are favored by a queuing party because they allow live agents to be used more effectively, which in turn reduces the costs of running call centers. Recent advances in technology are making IVR systems both easier to set up and more elaborate. Customer interactions that used to involve a live agent (by way of example, checking a bank balance or making a payment) are being delegated more and more to the "automated attendant". It's clear that IVRs will be in wide use around the world at least for the foreseeable future.

However, IVR systems can be very frustrating to the waiting party. By way of example:

1. Queuing parties are putting more and more marketing messages into their IVRs, which may provide no value to the waiting party and increases the time it takes him or her to accomplish his objective.

2. For very long menus, it can be hard for the waiting party to remember all the options by the time the menu completes.
3. Often the waiting party simply wants to speak to a live agent, but the path to get there is not obvious. In fact, sometimes queuing parties make reaching an agent deliberately obtuse.

The embodiments presented herein provide a communications system and corresponding method. In some embodiments, the method includes receiving a request from a waiting party to call a particular node of a particular IVR system of a particular party (the queuing party). The queuing party is then called and sent appropriate commands (e.g. DTMF tones or voice cues) such that the desired node of the IVR map is reached. When the requested node is detected, the waiting party is called or informed, at a phone number or generally at a voice address (or other real-time communication address previously indicated by the waiting party or known by the system), and connected to the queuing party.

The embodiments presented herein bring advantages to the waiting party by removing the need to listen and chose through unnecessary nodes in the IVR map. The waiting party may also save money from the reduced phone time (especially if the waiting party is using a mobile phone). Furthermore, the embodiments presented herein imply no explicit cost or effort to the queuing party.

Figure 2:
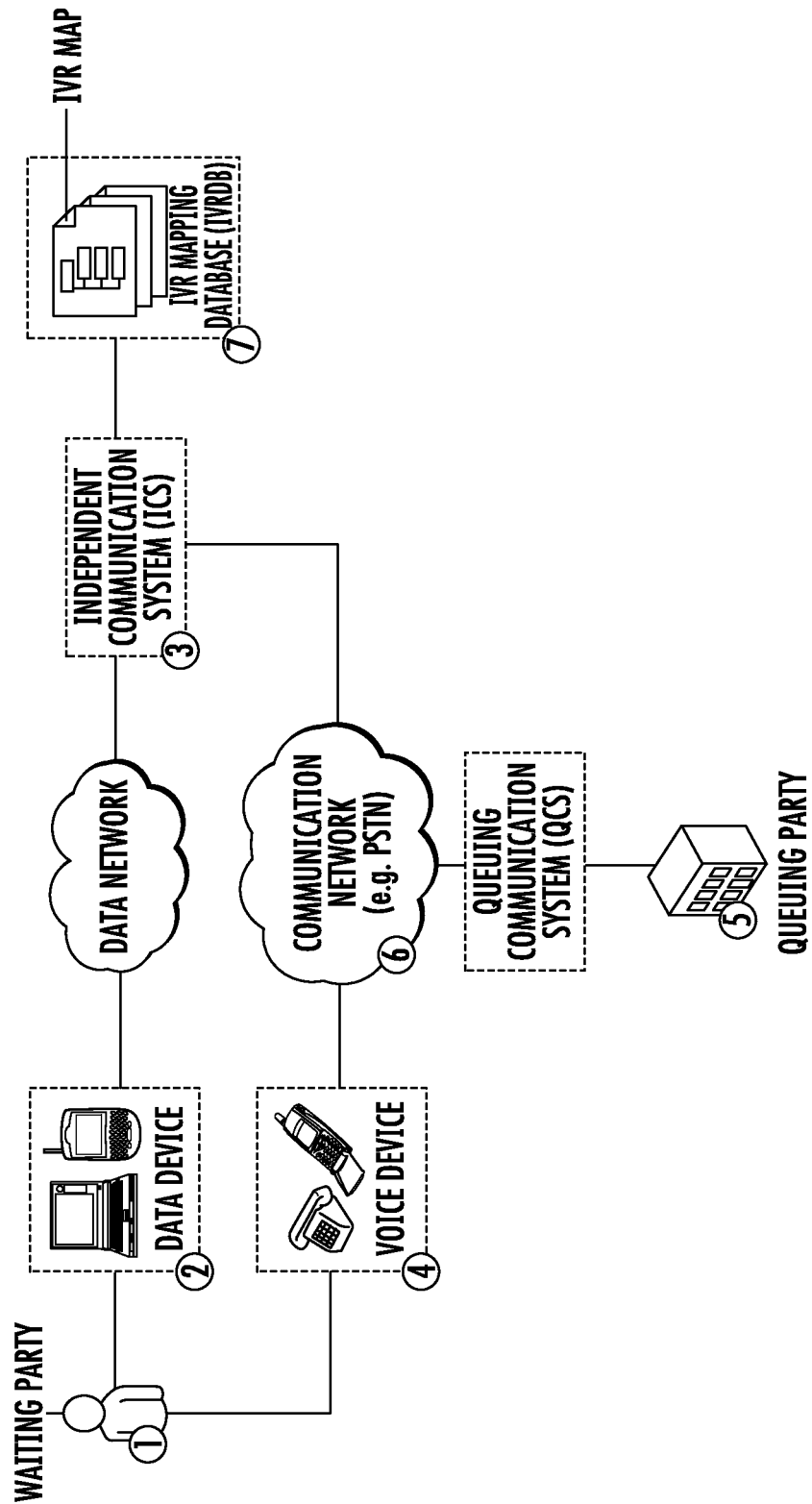
FIG. 2 is an illustration of a communications system that incorporates an exemplary embodiment related to IVR mapping and deep dialing.

FIG. 2 shows an illustrative communications system that incorporates an exemplary embodiment. The waiting party 1 interacts with a data device 2 for controlling an independent calling system (ICS) and receiving information from it. The data device could be embodied as a web site on a PC or mobile device, which interacts with the ICS 3 through a data network such as internet. The waiting party also interacts with an audio device 4 for real-time audio communication with the queuing party over a real-time audio communication network 5. The audio device could be a fixed-line or wireless telephone (alternatively an IP/web/internet-based phone or softphone). The real-time audio communication network could be the public switched telephone network (PSTN) (alternatively a wireless network, the internet, or an LAN/WAN). Typically the queuing party is a large company or a service center, but in some embodiments, this may not be the case. An IVR database 6 stores IVR maps that allow the ICS to navigate the IVR properly.

Figure 3:
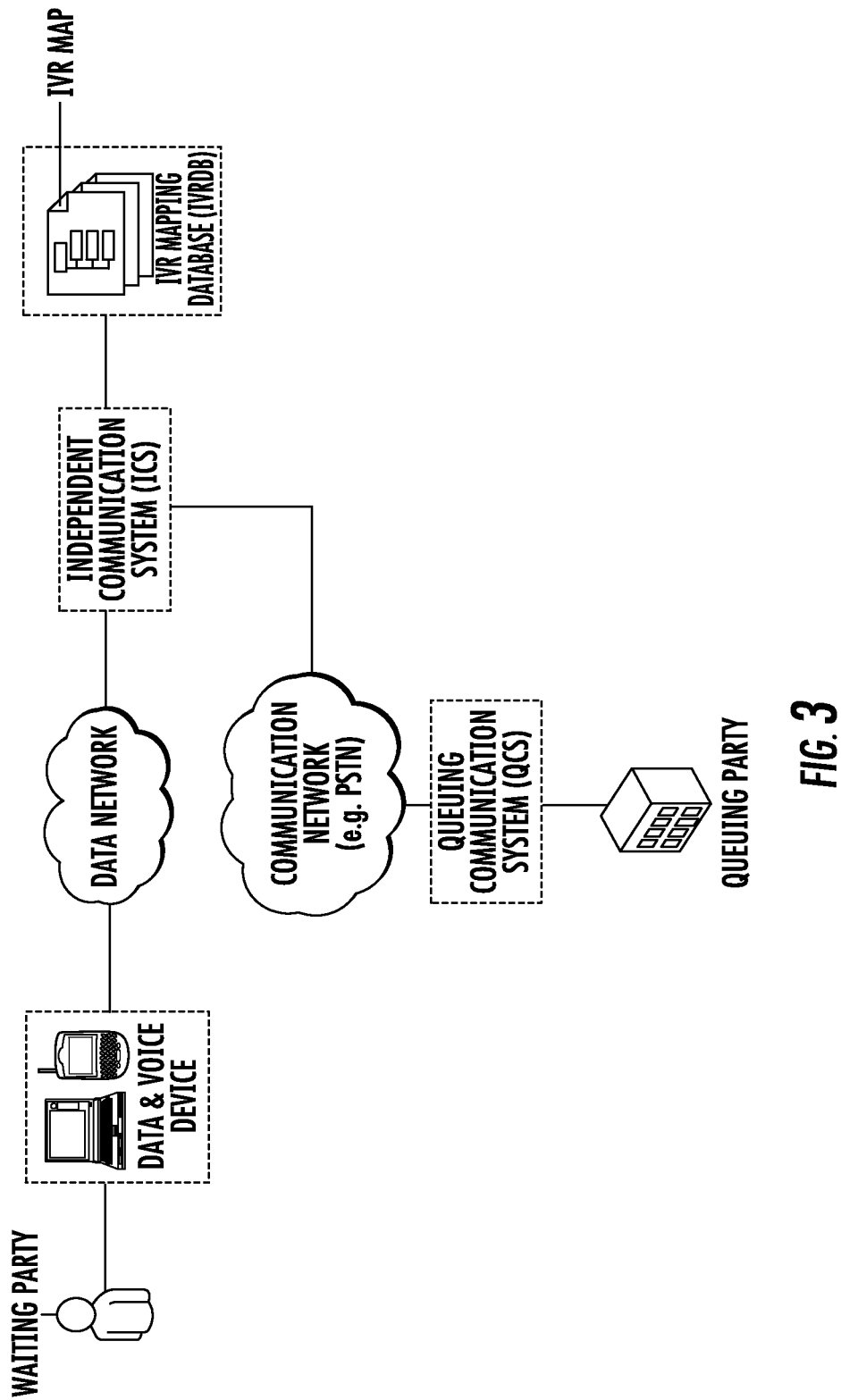
FIG. 3 is an illustration of a communications system that incorporates an exemplary embodiment audio device is an "IP-based" phone.

FIG. 3 illustrates another communications system that incorporates an exemplary embodiment. In this embodiment, the audio device is an "IP/web/internet-based" phone, meaning that it communicates over a packet-based network, such as internet. The audio device in this case, may also be a softphone that operates as software on a computer. It is further possible that the audio device is a softphone operating on the waiting party's data device, so that one device fills the roles of both audio device and data device.

Figure 4:
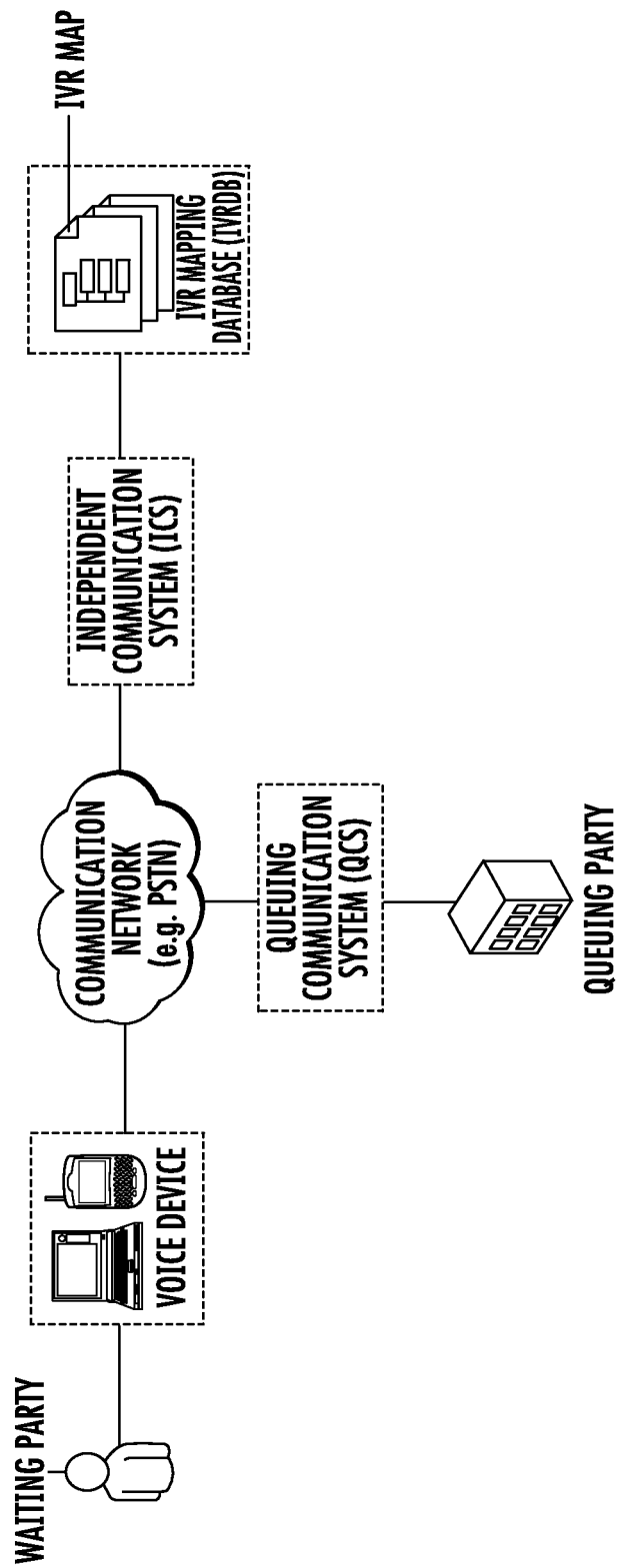
FIG. 4 is an illustration of a communications system that incorporates an illustrative embodiment in which the role of the data device is replaced by an IVR system.

FIG. 4 illustrates yet another communications system that incorporates an exemplary embodiment. In this embodiment, the role of the data device is replaced by an IVR system, operated by the ICS (a separate IVR from that of the queuing party). In this embodiment, the waiting party controls the ICS and receives data from it through an audio device, using commands such as DTMF tones or voice cues. In this embodiment, one device fills the roles of both audio device and data device.

The Voice Address

In some embodiments, the waiting party must specify a voice address (a phone number, a SIP address, web/internet-based phone address, etc.) that allows real-time two-way audio communication between the waiting party and the ICS. In some embodiments, the voice address is selected automatically based on information about the waiting party (such as the last voice address he or she used) stored in a database accessible by the ICS and/or information that identify the data device (such an IP address or a browser cookie).

Typical Transaction

Figure 5:
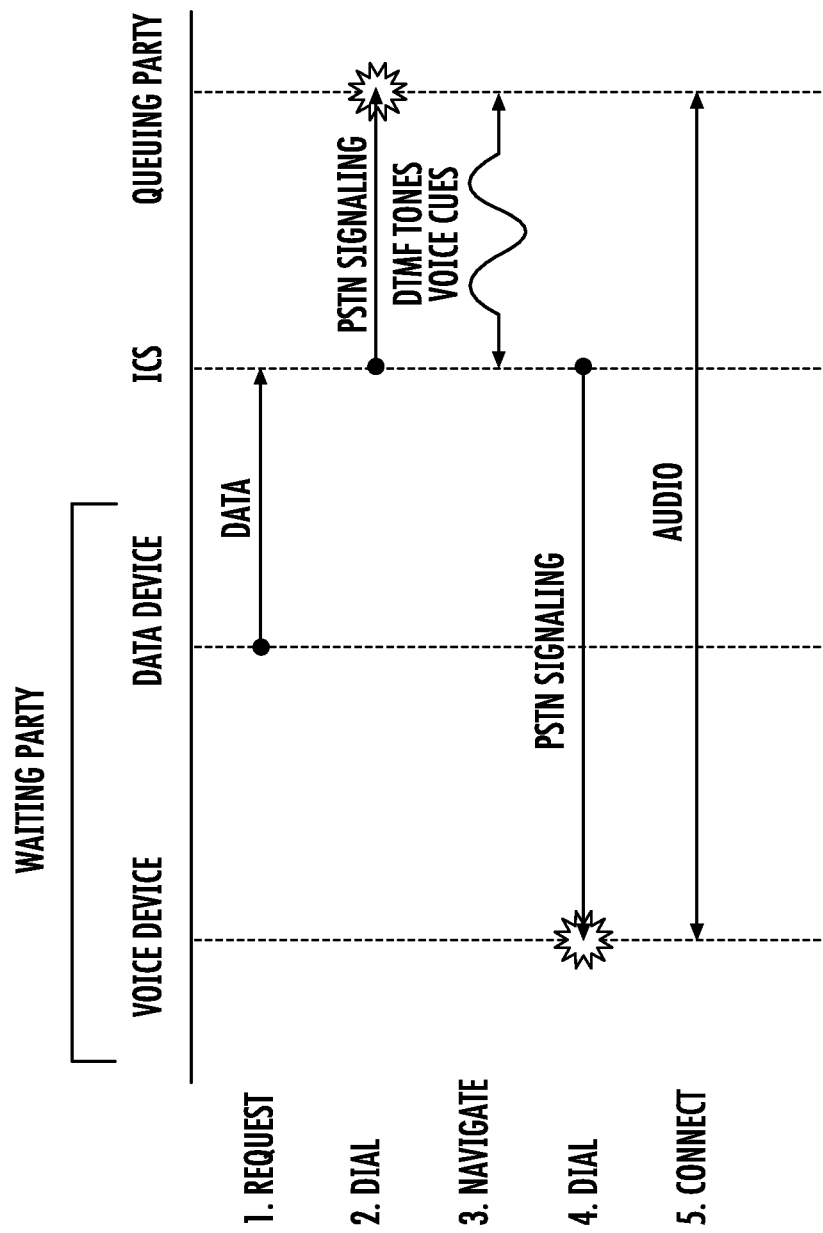
FIG. 5 is an illustrative timeline describing a typical transaction using a system built according to an exemplary embodiment.

FIG. 5 illustrates a timeline describing a typical transaction using a system built according to an exemplary embodiment. The system is further elaborated below, where the numbers correspond to the steps in FIG. 5 and inlcude:

1. The transaction begins when a waiting party makes a request to the ICS, through the data device, to place a call to the queuing party, and reach a particular node in their IVR map.
2. The ICS dials the queuing party, e.g. over the PSTN, and connects to the QCS.
3. The ICS sends to the QCS the commands required to navigate the IVR map to the requested node. These commands could be DTMF tone, voice cues, software commands, etc.
4. The ICS dials the waiting party using the information he or she provided in step 1. In certain embodiments, this step is not necessary.
5. When the waiting party answers, he or she is connected to the CCS, and can interact with the CCS normally.

Reporting Status to the Waiting Party

In some embodiments, the ICS can report the status of the call (transaction) to the waiting party in a variety of ways. In embodiments where the data device has a visual interface (e.g. on a PC, mobile device, multi-media device etc.), the status may be displayed via graphical presentation as shown in FIG. 6. The data reported may include the "state" of the transaction (which may indicate, for example, which stage of the timeline from FIG. 5 is current). In other embodiments, this information could be reported as audio or plain text.

Collecting Aggregate Statistics

As the ICS is used by many waiting parties over a period of many days, it is possible for aggregate statistics to be collected about some queuing parties, such as which nodes are more popular than others. Other useful statistics could include average hold time to connect to a node, call volume, call duration, and optimal time to schedule a call.

Pre-Dialing

One issue that needs to be addressed regarding the procedures described above in typical transaction, as illustrated in FIG. 5, is that the waiting party may not be able to hear the beginning of the prompt of the node he or she has requested. This is because it takes time for the ICS to establish the connection through the audio device (e.g. in the case where the audio device is a telephone, it takes time to reach the phone and press the appropriate key to accept the call.) In some embodiments, the ICS addresses this problem by dialing the waiting party prior to the last step in navigating the IVR map. Accordingly, when the connection is established, the ICS sends the command to perform the final navigation. This approach allows the waiting party to hear the prompt for the requested node in its entirety.

The waiting party can change his or her voice address.

In some embodiments, the ICS can allow the waiting party to change the voice address after the call request has been initiated. In certain embodiments, this change may be possible at any point up to step 4 in FIG. 5. In the embodiments where the data device has a visual interface (e.g. on a PC or mobile device), this process could be initiated by clicking a button (e.g. "Change voice address") as shown in FIG. 6. In other embodiments, this interaction may be voice-based or text-based.

The waiting party can cancel the call.

In some embodiments, the ICS can allow the waiting party to cancel the call after the call request has been initiated. In certain embodiments, this change may be possible at any point up to step 4 in FIG. 5. In embodiments where the data device has a visual interface (e.g. on a PC or mobile device), this process could be initiated by clicking a button (e.g. "Cancel Call") as shown in FIG. 6. In other embodiments, this interaction may be voice-based or text-based.

Other functions may include the waiting party requesting the handoff of the call to another party, or could place an advance scheduled calling, or change the voice address at which he or she desired to be reached. First two functions could take place via proper arrangement or programming prior to the ICS reaching the desired node and calling back the waiting party. The advance scheduled calling accommodates the waiting party's plans.

One advantage and feature of the embodiments presented herein is to provide a communication system and method which allow a waiting party to connect directly to a point inside the IVR System of a particular queuing party. The IVR system of the queuing party combined with any other communication systems of the queuing party are referred to herein as the queuing communication system (QCS). In this context connecting "directly" means that the waiting party does not have to enter any commands to navigate the IVR map. This process is referred to as deep dialing, in that it allows the waiting party to connect "deep" into the IVR menu.

Another advantage and feature of the embodiments presented herein is to provide such a system and method in a way that requires no changes to the QCS.

Another advantage and feature of the embodiments presented herein is to provide such a system and method in a way that is transparent to the queuing party, requires no negotiation with the queuing party and requires no cooperation from the queuing party.

Another advantage and feature of the embodiments presented herein is to provide such a system and method in a way that provides real-time, or near real-time, feedback to the waiting party about the status of his call.

Another advantage and feature of the embodiments presented herein is to provide such a system and method in a way that allows the waiting party, queuing party, or a third party to collect aggregate statistics such as the most commonly requested nodes in a particular IVR map. Such aggregate statistics could include popular nodes, average hold time to connect to a node, call volume, call duration, and an optimal time to schedule a call.

Another advantage and feature of the embodiments presented herein is to provide such a system and method in a way that allows the waiting party to specify a voice address (typically a phone number but also potentially a SIP address, web-based phone address, etc.) that allows real-time two-way audio communication where he or she can be reached and allows the waiting party to change the voice address while the deep dialing call is in progress.

Another advantage and feature of the embodiments presented herein is to provide such a system and method in a way that automatically selects an appropriate voice address based on profile information stored about the waiting party or other information.

Another advantage and feature of the embodiments presented herein is to provide such a system and method in a way that allows the waiting party to cancel the deep dialing call.

Another advantage and feature of the embodiments presented herein is to provide such a system and method in a way that allows the waiting party to change his or her voice address, or hand off to a third party during the deep dialing process.

Another advantage and feature of the embodiments presented herein is to provide such a system and method in a way that allows the waiting party to arrange or program for advance scheduled calling of a particular node in an IVR menu.

Many modifications and other embodiments of the invention will come to the mind of one skilled in the art having the benefit of the teachings presented in the foregoing descriptions and associated drawings. Therefore, it is understood that the invention is not to be limited to the specific embodiments disclosed, and that modifications and embodiments are intended to be included within the scope of the appended claims.

That which is claimed is:

1. An independent communication system (ICS) used in a transaction between a waiting party and a queuing party, the queuing party having an interactive voice response (IVR), the IVR having a plurality of nodes, the ICS operating independently of the queuing party to receive a request from the waiting party to connect to a particular node prior to the transaction taking place, and to facilitate connecting the waiting party to the particular node in the IVR using DTMF tones, voice cues, and software commands in combination with an IVR map that is separate from the IVR of the queuing party to navigate to the particular node in the IVR independently from the queuing party.

2. An independent communication system (ICS) used in a transaction between a waiting party and a queuing party, the queuing party having an interactive voice response (IVR), the IVR having a plurality of nodes, the ICS adapted to receive a specific voice address and a request from the waiting party to connect to a particular node, and to facilitate connecting the waiting party using an IVR map that is separate from the IVR of the queuing party, via a call back to the specific voice address, to the particular node in the IVR, using DTMF tones, voice cues, and software commands to navigate to the particular node in the IVR.

3. The ICS of claim 2, wherein the ICS is adapted to call the waiting party prior to a last step in navigating the IVR map.

4. The ICS of claim 1, wherein the ICS is adapted to inform the waiting party of the status of the transaction via at least one of graphical presentation, text, and audio.

5. An independent communication system (ICS) used in a transaction between a waiting party and a queuing party, the queuing party having an interactive voice response (IVR), the IVR having a plurality of nodes, the ICS adapted to receive an advance schedule calling request from the waiting party to connect to a particular node, and to facilitate connecting the waiting party to the particular node in the IVR according to the advance schedule calling request, using DTMF tones, voice cues, and software commands in combination with an IVR map that is separate from the IVR of the queuing party to navigate to the particular node in the IVR.

6. The ICS of claim 1, wherein the ICS is adapted to generate aggregate statistics about a queuing party, said aggregate statistics comprising at least one of popular node or nodes, average hold time to connect to a node, call volume, call duration, and optimal time to schedule a call.

7. The ICS of claim 6, wherein the ICS is further adapted to display or inform the aggregate statistics.

8. The ICS of claim 1, wherein the ICS is adapted to automatically select an appropriate voice address of the waiting party.

9. The ICS of claim 8, wherein the ICS is adapted to select the voice address based on profile information about the waiting party.

10. A method used in a transaction between a waiting party and a queuing party, the queuing party having an interactive voice response (IVR), the IVR having a plurality of nodes, the method comprising operating independently of the queuing party to receive a request from the waiting party to connect to a particular node prior to the transaction taking place, and facilitating to connect the waiting party to the particular node in the IVR using DTMF tones, voice cues, and software commands in combination with an IVR map that is separate from the IVR of the queuing party to navigate to the particular node in the IVR independently from the queuing party.

11. A method used in a transaction between a waiting party and a queuing party, the queuing party having an interactive voice response (IVR), the IVR having a plurality of nodes, the method comprising receiving a specific voice address and a request from the waiting party to connect to a particular node in the IVR, and facilitating connecting the waiting party via a call back to the specific voice address, to the particular node in the IVR, using DTMF tones, voice cues, and software commands in combination with an IVR map that is separate from the IVR of the queuing party to navigate to the particular node in the IVR.

12. The method of claim 11, further comprising calling the waiting party about the same time or prior to a last step in navigating the IVR map.

13. The method of claim 10, further comprising informing the waiting party of the status of the transaction via at least one of graphical presentation, text, and audio.

14. An independent communication system (ICS) used in a transaction between a waiting party and a queuing party, the queuing party having an interactive voice response (IVR), the IVR having a plurality of nodes, the ICS adapted to receive an advance schedule calling request from the waiting party to connect to a particular node, and to facilitate connecting the waiting party to the particular node in the IVR according to the advance schedule calling request, using DTMF tones, voice cues and software commands in combination with an IVR map that is separate from the IVR of the queuing party to navigate to the particular node in the IVR.

15. The method of claim 10, further comprising generating aggregate statistics about a queuing party, said aggregate statistics comprising at least one of popular node or nodes, average hold time to connect to a node, call volume, call duration, and optimal time to schedule a call.

16. The method of claim 15, further displaying or informing the aggregate statistics.

17. The method of claim 10, further comprising automatically selecting an appropriate voice address of the waiting party.

18. The method of claim 17, further comprising selecting the voice address based on profile information about the waiting party.

19. A communication system (CS) used in a transaction between a waiting party and a queuing party, wherein the queuing party includes an interactive voice response (IVR), and wherein the IVR includes a plurality of nodes, the CS adapted to present a graphical presentation of the IVR to the waiting party, receive a request from a device used by the waiting party to connect the device to a particular node prior to the transaction taking place, and connect the waiting party to the particular node in the IVR, using DTMF tones, voice cues, and software commands in combination with an IVR map that is separate from the IVR of the queuing party to navigate to the particular node in the IVR, wherein the waiting party is not required to have previously interacted with the queuing party.

20. The CS of claim 19, wherein the CS is further adapted to inform the waiting party of a connection or an imminent connection to the particular node.

21. A method used in a transaction between a waiting party and a queuing party, wherein the queuing party includes an interactive voice response (IVR), and wherein the IVR includes a plurality of nodes, the method comprising presenting at least a section menu of the plurality of nodes of the IVR to a device used by the waiting party prior to the transaction taking place to allow the waiting party to select a particular node in the IVR, further facilitating connecting the device to the particular node in the IVR using DTMF tones, voice cues, and software commands in combination with an IVR map that is separate from the IVR of the queuing party to navigate to the particular node in the IVR, wherein the waiting party is not required to have previously interacted with the queuing party.

22. The method of claim 21, further receiving a request from the waiting party to connect to a particular node in the IVR.

23. The method of claim 22, further facilitating connecting the waiting party to the particular node in the IVR.

24. The method of claim 21, further comprising informing the waiting party of a connection or an imminent connection to the particular node.

25. A method used in a transaction between a waiting party and a queuing party, wherein the queuing party includes an interactive voice response (IVR), and wherein the IVR includes a plurality of nodes, the method comprising:
   presenting a graphical user interface displaying a plurality of nodes from the IVR to the waiting party;
   receiving from a device used by the waiting party a selection of a particular node of the plurality of nodes from the waiting party; and
   facilitating connecting the device to the particular node in the IVR using of DTMF tones, voice cues, and software commands in combination with an IVR map that is separate from the IVR of the queuing party to navigate to a particular node in the IVR, wherein the waiting party is not required to have previously interacted with the queuing party.

26. A method used in a transaction between a waiting party and a queuing party, wherein the queuing party includes an interactive voice response (IVR), and wherein the IVR includes a plurality of nodes, the method comprising connecting a device used by the queuing party to a particular node in the IVR using DTMF tones, voice cues, and software commands in combination with an IVR map that is separate from the IVR of the queuing party and to navigate to the particular node in the IVR and informing the waiting party of a status of the transaction via one of graphical presentation or text to the device, wherein the waiting party is not required to have previously interacted with the queuing party.

27. The method of claim 26, further comprising informing the waiting party through a computing or mobile device.

* * * * *